A. F. FRENCH.
Harrow.
No. 216,387. Patented June 10, 1879.
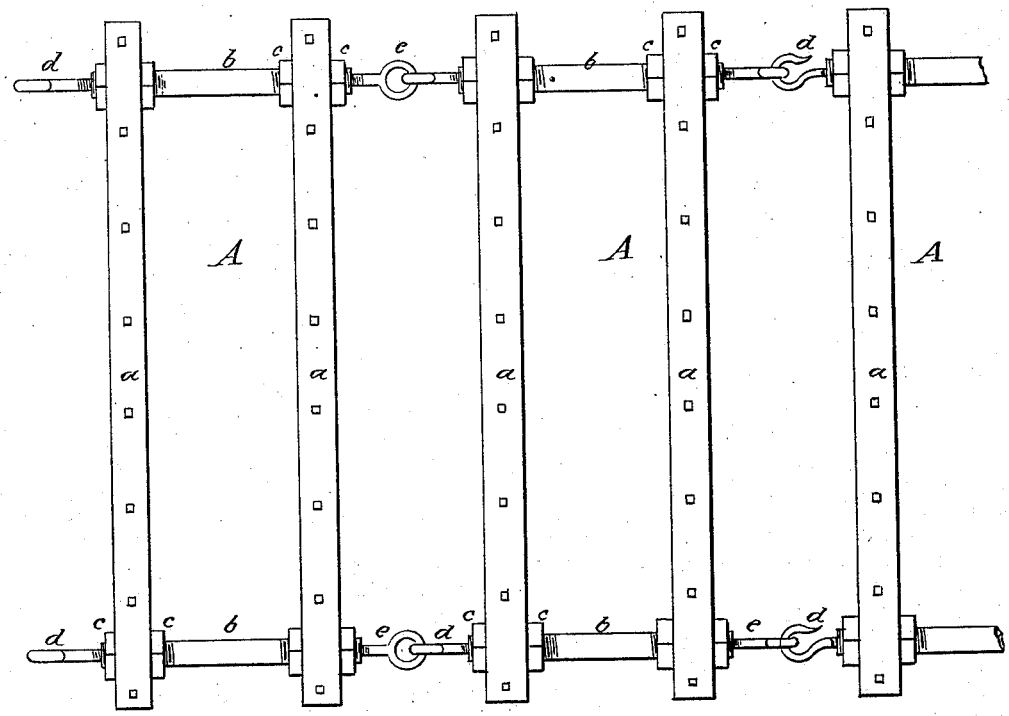
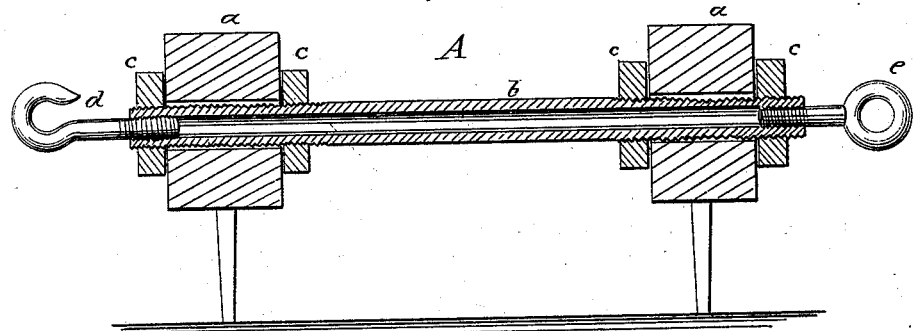
WITNESSES:
Chas. Nida
C. Sedgwick
INVENTOR:
A. F. French
BY Munn & Co
ATTORNEYS.

UNITED STATES PATENT OFFICE.

AARON F. FRENCH, OF DENISON, IOWA, ASSIGNOR TO HIMSELF AND ALEXANDER P. McCAUL, OF SAME PLACE.

IMPROVEMENT IN HARROWS.

Specification forming part of Letters Patent No. 216,387, dated June 10, 1879; application filed March 26, 1879.

*To all whom it may concern:*

Be it known that I, AARON F. FRENCH, of Denison, in the county of Crawford and State of Iowa, have invented a new and useful Improvement in Harrows, of which the following is a specification.

The invention consists in certain novel features of construction whereby iron and wood are combined in a harrow in a manner to render the harrow more durable than heretofore, and admit of repairs with great facility.

The improved harrow is shown in the accompanying drawings, wherein—

Figure 1 is a plan view. Fig. 2 is a section transversely of one section.

Similar letters of reference indicate corresponding parts.

The harrow is made in sections, A A, hooked together when in use, as usual. Each section A consists of two wooden cross-bars, $a$ $a$, that are fitted with teeth or spikes. The bars $a$ of each section are held rigidly at suitable distance apart by a brace or tube, $b$, at each end. These braces $b$ consist of iron rods or tubing, cut off in suitable lengths, and having a screw-thread cut at each end. The ends are passed through holes bored in bars $a$, and the bars $a$ are clamped between nuts $c$ $c$ upon the braces.

The hooks $d$ and eyes $e$ are screwed into the ends of tubes $b$, as shown. Thereby the braces $b$ constitute end bars and draft-rods for the harrow.

By this construction there are no joints of wood to rot and get loose. Each section is strong and durable. In case of a hook or eye breaking it can be replaced readily without taking the sections apart. It will be necessary only to unscrew the broken eye or hook and put in a new one.

The usual number of sections will be used for the harrow, and the length and width of each section may be as required.

Having thus described my invention, I claim as new and desire to secure by Letters Patent—

The tooth-bars of a harrow, connected by the internally and externally threaded tubes $b$, nuts $c$, hooks $d$, and eyes $e$, all arranged substantially as shown and described.

AARON F. FRENCH.

Witnesses:
A. W. CLAPP,
W. C. MATTHEWS.